(12) United States Patent
Weast

(10) Patent No.: US 7,832,147 B2
(45) Date of Patent: Nov. 16, 2010

(54) METHOD AND APPARATUS FOR ELEVATED STACKING OF PLANTERS

(76) Inventor: Suzanne Weast, 6583 Robinea Dr., Carlsbad, CA (US) 92011

( * ) Notice: Subject to any disclaimer, the term of this patent is extended or adjusted under 35 U.S.C. 154(b) by 107 days.

(21) Appl. No.: 12/348,900

(22) Filed: Jan. 5, 2009

(65) Prior Publication Data

US 2009/0173004 A1 Jul. 9, 2009

Related U.S. Application Data

(60) Provisional application No. 61/018,739, filed on Jan. 3, 2008.

(51) Int. Cl.
*A01G 9/02* (2006.01)
(52) U.S. Cl. .......................................................... 47/86
(58) Field of Classification Search ...................... 47/39, 47/65, 65.5, 66.6, 82, 83, 86
See application file for complete search history.

(56) References Cited

U.S. PATENT DOCUMENTS

| | | | | | |
|---|---|---|---|---|---|
| 289,102 | A | * | 11/1883 | Holden | 47/79 |
| 1,637,250 | A | * | 7/1927 | Ashing | 47/14 |
| 3,076,589 | A | * | 2/1963 | Meijdam | 229/100 |
| 4,276,720 | A | * | 7/1981 | Lyon | 47/39 |
| 4,561,208 | A | * | 12/1985 | Schultz | 47/83 |
| 4,593,490 | A | * | 6/1986 | Bodine | 47/79 |
| 5,367,823 | A | * | 11/1994 | Ferris | 47/39 |
| 5,511,342 | A | * | 4/1996 | Maso | 47/83 |
| 5,673,511 | A | * | 10/1997 | Holtkamp, Jr. | 47/18 |
| D547,325 | S | * | 7/2007 | Stanton et al. | D11/156 |
| 7,373,753 | B1 | * | 5/2008 | Caruso | 47/83 |
| D589,728 | S | * | 4/2009 | Shaha et al. | D6/510 |
| 2008/0155896 | A1 | * | 7/2008 | Chen | 47/65.6 |
| 2009/0173004 | A1 | * | 7/2009 | Weast | 47/83 |
| 2009/0211154 | A1 | * | 8/2009 | DiMaggio | 47/83 |

FOREIGN PATENT DOCUMENTS

EP 623276 A2 * 11/1994
GB 2096443 A * 10/1982

* cited by examiner

*Primary Examiner*—Francis T Palo
(74) *Attorney, Agent, or Firm*—Donn K. Harms

(57) ABSTRACT

A modular planter assembly formed of a base planter housing having a cavity volume for dirt or growing material defined by a surrounding vertically disposed sidewall. Smaller elevated planters are supportable above the base planter on support members extending between a pair of vertically disposed elongated members which engage passages formed in the sidewall of the base planter. The elongated members may be one piece, or formed of a plurality of component members to allow the user to lengthen them and add multiple elevated planters to the formed device.

11 Claims, 3 Drawing Sheets

METHOD AND APPARATUS FOR ELEVATED STACKING OF PLANTERS

This application claims the benefit of U.S. Provisional Patent Application No. 61/018,739 filed on Jan. 3, 2008, and which is incorporated herein in its entirety by reference.

FIELD OF THE INVENTION

The disclosed device relates to gardening and the employment of planters for holding of soil and plants. More particularly it relates to a device which allows for the stacking of planters in elevated positions to increase the potential number of plants that may be grown in small areas such as patios, sunrooms, fence railings and rooftops where space is a premium. The disclosed device is individually configurable to varying situational installations due to its modular construction.

BACKGROUND OF THE INVENTION

Gardening as a hobby and as a necessity to grow food, has been a human endeavor for thousands of years. In earlier times when land was abundant home gardens of flowers, vegetables, and decorative plants, were normally planted in plots somewhere on a large area of land occupied by the home or business. Modernly, with the growth of urban areas upward, an estimated 47 million condominiums and apartments have risen, all with limited patios or garden areas for enjoyment by their occupants. Further, with the increasing value of land in the suburbs, the provision of yards and garden areas to homeowners and occupants is ever-shrinking. Many apartment dwellers in urban areas such as New York and Chicago have no yard whatsoever. Such apartments may however provide a hanging patio projecting from a side of the building to allow occupants a small area to lounge outdoors. Or, they might have a sunroom featuring skylights which allow sunlight into the room for a feeling of outdoors. Residential properties which are not multistory also suffer from the lack of a yard due to small lots or the fact that the housing is a condominium with common space for all residents which is not employable for gardens, and a small patio area where the owner is relegated to do any gardening or growing they might wish.

Consequently for a great many homeowners and renters and business occupants of commercial buildings, the area provided or available for gardening is severely limited. While this may not bother many occupants, gardening is a largely enjoyed hobby of millions of apartment, condominium, and home dwellers.

In cases of gardening in small areas such as patios, the sole choice for a resident to grow plants is through the employment of planters or pots in which the plants are grown. Such planters are frequently large rectangular or circular pots having an internal cavity defined by a sidewall and accessible through an open aperture defined by the distal edge of the sidewall.

In such planters, resident gardeners will deposit a soil mixture suitable to the intended plant that will occupy the pot or planter. Thereafter, a plant will be either started or transplanted into the soil and the gardener will have the small plot of soil contained in the planter in which to cultivate their flowers, or vegetables, or house plants, or other plants of choice.

As can be ascertained, with floor space on a patio at a premium, very few large planters can occupy the floor space before there is insufficient room to walk and work. The gardener is left with little choice but to limit their growing to a minimal amount of plants due to the floor space or a limited number of planters or pots available.

As such, there exists an unmet need, for a planter and pot device which allows for the use of airspace in small growing areas by stacking a plurality of planters above lower level planters. Such a device should be highly adaptable to allow vertical stacking of planters in an easy fashion for the user by allowing for easy engagements to supporting structures. Such a device should provide a common manner of engagement of the planters to an elevated supporting system so as to allow an interchangeability of the planters engaged to the finished structure to maximize the growing area available to the user in a small support surface footprint. Further, such a system should require little maintenance and be extremely simple to setup and employ so average homeowners can assemble and use it and configure it to their liking.

Still further, such a system should be very stable to prevent tipping of the elevated planters in wind or when watered or overgrown and heavy.

The system herein described and disclosed features a novel vertical planting system which provides for a stacked positioning of a plurality of planters sequentially above a below-situated planter. In one especially preferred mode, three planters are provided to allow a small-space gardener to have the benefit of an entire garden in a patio space no bigger than 32 inches by 17 inches.

Anchoring each elevated stack of planters is a large base planter which when filled is sufficiently larger and heavier than the overhead planters to which it provides support, and therefore, it prevents tipping of the structures. In this fashion the larger lower planter provides an anchor to the overhead structure and overhead planters which is especially stable. The base planter is formed with built-in slots or pole-stays which are of a size adapted for slidable engagement with a plurality of metal poles to hold the poles in a substantially vertical position relative to the flat support surfaced under the supporting base planter. Thus the poles when engaged in the slots achieve a substantially perpendicular alignment relative to the ground or support surface and provide an excellent and sturdy mount for overhead planters engaged thereto.

During initial assembly, these poles are inserted into the stays or slots formed into the sidewalls or a central support portion of the lower planter and remain frictionally engaged therein in a substantially tight fit. Once the support members or poles are so engaged, brackets may be engaged between the overhead planters and the vertically disposed support members. These brackets project substantially normal from the support members and parallel to the ground and can be engaged in a plurality of positions above the support surface and lower base planter to thereby allow for adjustment by the user for spacing of the planters from each other.

With the support brackets engaged, the smaller elevated planters are then engaged to the brackets which engage the poles. A number of embodiments can be employed depending on the patio or area in which the device is situated. A first preferred mode of the device features a larger base planter above which two smaller planters are suspended using pole-engaged brackets. Another mode of the device features a center mounting of the supporting poles or vertical members in the bottom base planter, and four to six overhead smaller planters hanging in pairs engaged upon opposite sides of the vertically disposed support members.

In an especially novel yet useful mode of the device, a saddle arrangement may be achieved. This mode of the device is especially well suited to patios having railings or bannisters. In this mode of the device, two planters are cooperatively engaged with a belt. The belt is then centered on the top of the railing and the two planters hang from the straps or belts on opposite sides of the railing which of course provides the support member. With the use of an additional belt the planters can also be attached to a fence for vertical display on a single side of the fence.

The support brackets for the elevated planters feature either brackets to hold the planters to vertically disposed members, or, cross members having a triangular engagement with one side of the elevated planters adapted to co-operatively engage clips on the cross member. The three point or triangular engagement has been found to be especially stable against tipping and wind lift which can be a concern on roof tops.

The planters are interchangeable with each other on their bracket engagement to the vertical pole or support member so that they may be removed and used in other spots or shifted in and out of different positions relative to each other.

Optionally, but in a particularly preferred mode of the device, wheels are engaged to the base planter to allow the entire structure to be rolled to new positions. Further, a self watering system can be included which is most important with the busy schedules of potential users.

It is thus an object of the invention to provide a planting system which takes advantage of the airspace above small patios and growing areas to provide more plant growth areas.

It is a further object of the invention to provide such a plant holding and support system which is easily assembled.

Yet another object of the invention is the provision of such a planter support system which provides interchangeable mounts from support brackets to allow any of a plurality of overhead planters to be moved to any position.

With respect to the above description and background, before explaining at least one preferred embodiment of the invention in detail, it is to be understood that the invention is not limited in its application to the details of construction and to the arrangement of the components and/or steps set forth in the following description or illustrated in the drawings. The various apparatus and methods of the invention herein described and disclosed are capable of other embodiments and of being practiced 10 and carried out in various ways which will be obvious to those skilled in the art once they review this disclosure. Also, it is to be understood that the phraseology and terminology employed herein are for the purpose of description and should not be regarded as limiting.

DETAILED DESCRIPTION OF THE PREFERRED EMBODIMENT

Figure 1:
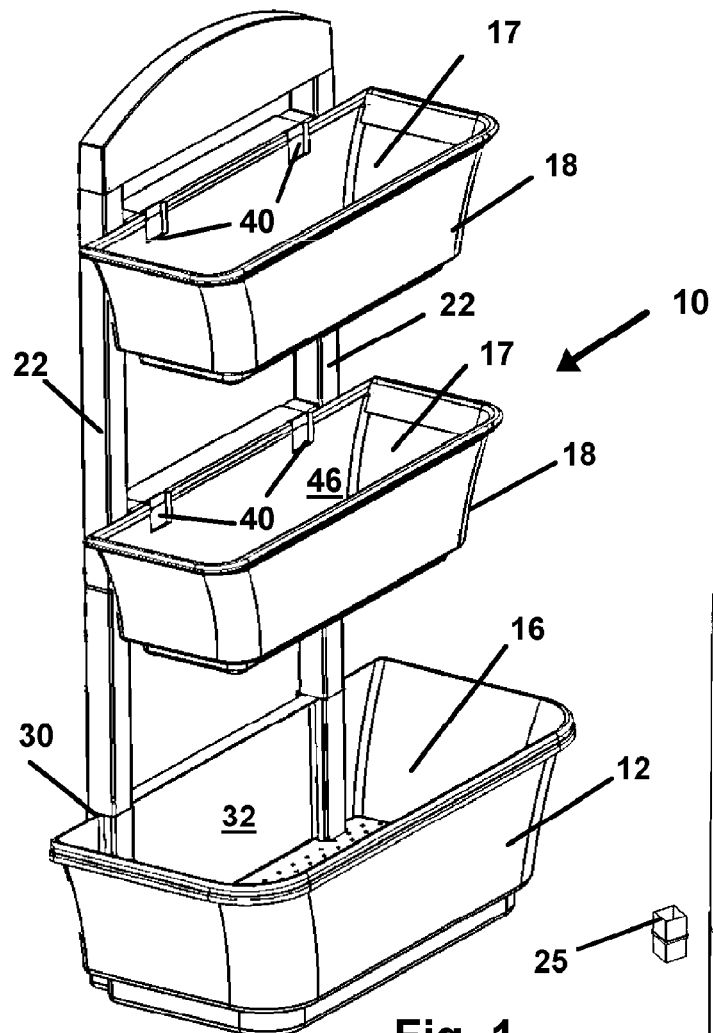
FIG. 1 depicts the device in an assembled mode showing the overhead planters engaged above the base planter.

Referring now to the drawings in FIGS. 1-7 where numerals designate the various components of the device 10, the device 10 is shown in the current preferred modes in accordance with the present invention.

Figure 2:
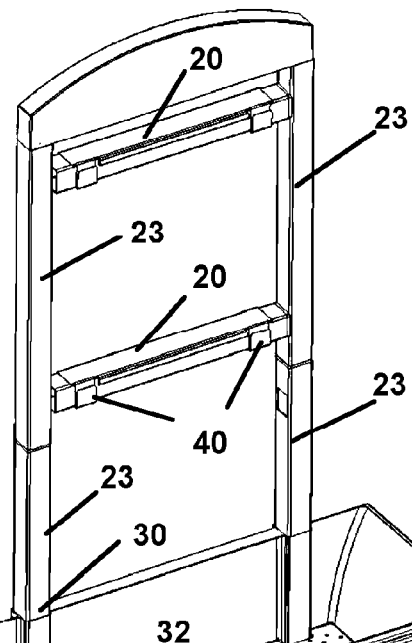
FIG. 2 shows the device of FIG. 1 with the overhead planters removed and cross members with mounts exposed.
Figure 3:
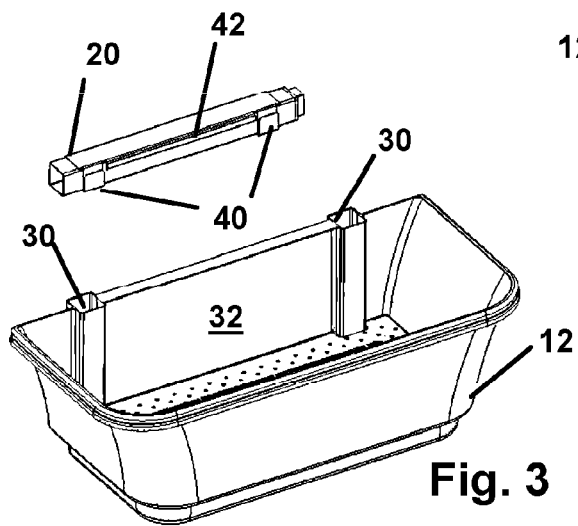
FIG. 3 shows components of the device of FIGS. 1 and 2.
Figure 4:
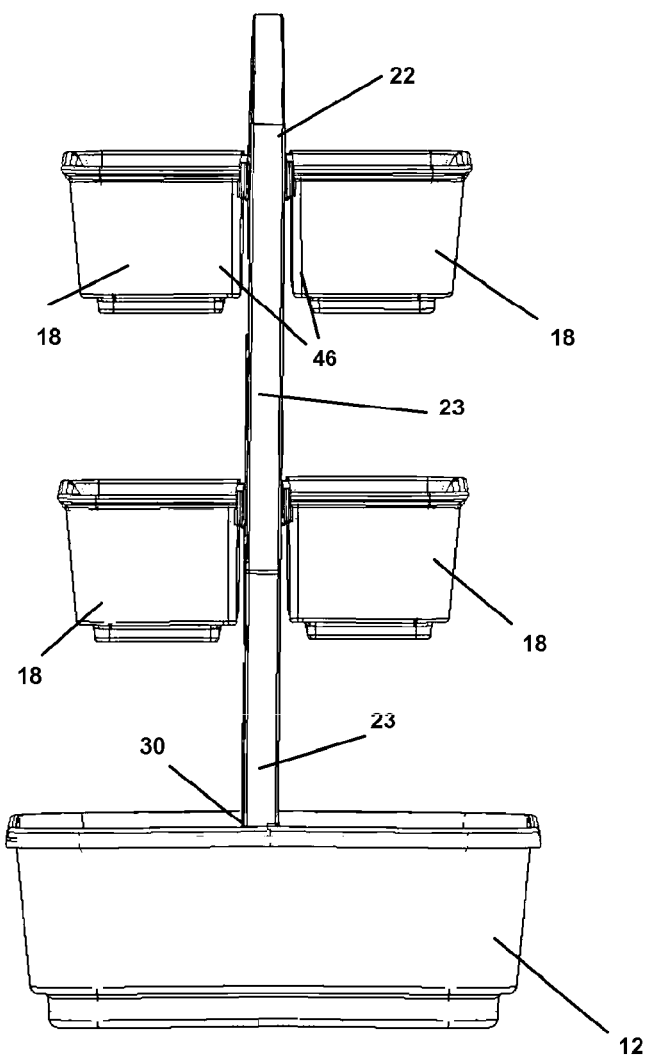
FIG. 4 depicts a dual sided version of the device with center mounted vertical posts supporting overhead planters.
Figure 5:
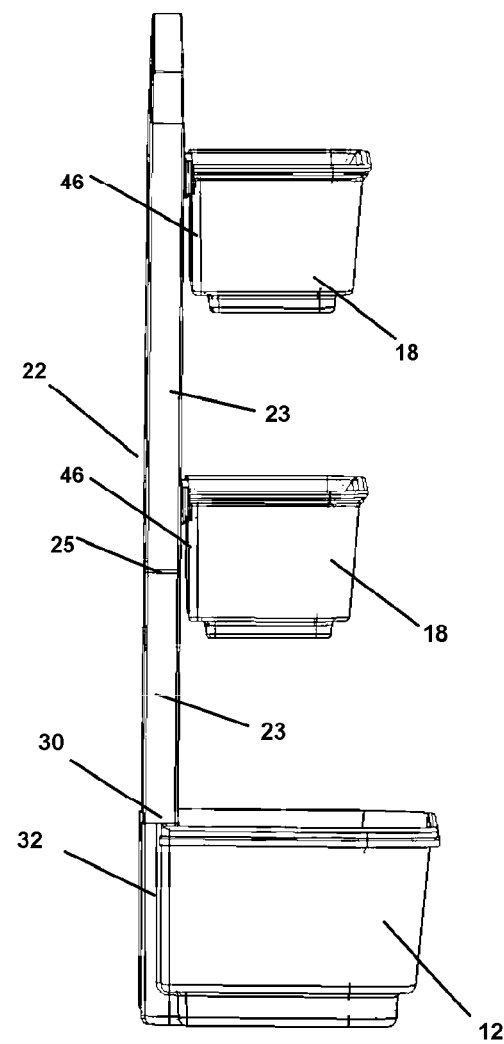
FIG. 5 depicts a side view of the device of FIG. 1.

In FIG. 1 the assembled view shows the components of the device 10 assembled into a one sided multiple planter mode. A base planter housing 12 having a strainer adapted to be in a suspended horizontal position above the bottom wall of the base planter housing 12 is shown. A lower cavity 16 formed in the base planter housing 12 should be substantially larger in volume than the cavities 17 of the overhead planters 18. Currently preferred is volume of two to one of the lower cavity 16 to the upper cavities 17 or more. This insures that the weight or mass of the base planter housing 12 is sufficient to support the overhead planters 18 which are engaged to support brackets 20 using a three point engagement. The support brackets 20 extend horizontally between vertical members 22 which may be one piece, or preferably formed of components as shown in FIG. 2. The use of components allows the vertical members 22 to be modular so the user may make them shorter or longer as the case may be to support one or a plurality of overhead planters 18.

The components of the vertical members 22 include component members 23 which are engaged together by fitting which frictionally engages the interior of adjacent component members 23. The device 10 may be thus formed with only one overhead planter 18 engaged, or a plurality of two or more engaged to the formed vertical members 22 by simply adding or subtracting the component members 23 and using the appropriate fitting 25 when needed. It is important to note that the volume and mass of the material placed in the base planter housing 12 cavity 16, should exceed the weight or mass of the material placed in the overhead planter housings 18 to maintain the device stable. The modular construction allows the user great flexibility in that they might use soil in the lower cavity 17 and potting soil which is much lighter in the cavities 17 overhead and build the device taller.

The formed vertical members 22 engage at a first end, with an elongated passage 30 formed in the sidewall 32 of the base planter housing 12. No tools are necessary and a very solid mount is obtained in a friction fit. In the mode of the device in FIG. 4, a central pillar is formed in the middle of a larger base planter housing 12 to support the upright mounting of the vertical members 22 and dual mounting of the overhead planter housings 18 overhead.

Figure 7:
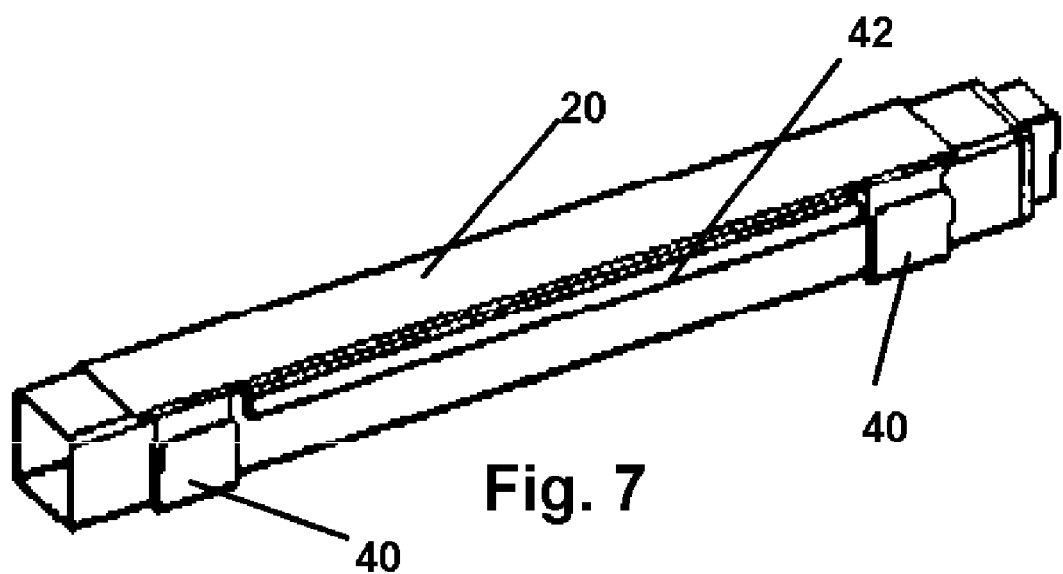
FIG. 7 shows the preferred three point mount engaged upon the cross bar which extends between the vertical members.
Figure 6:
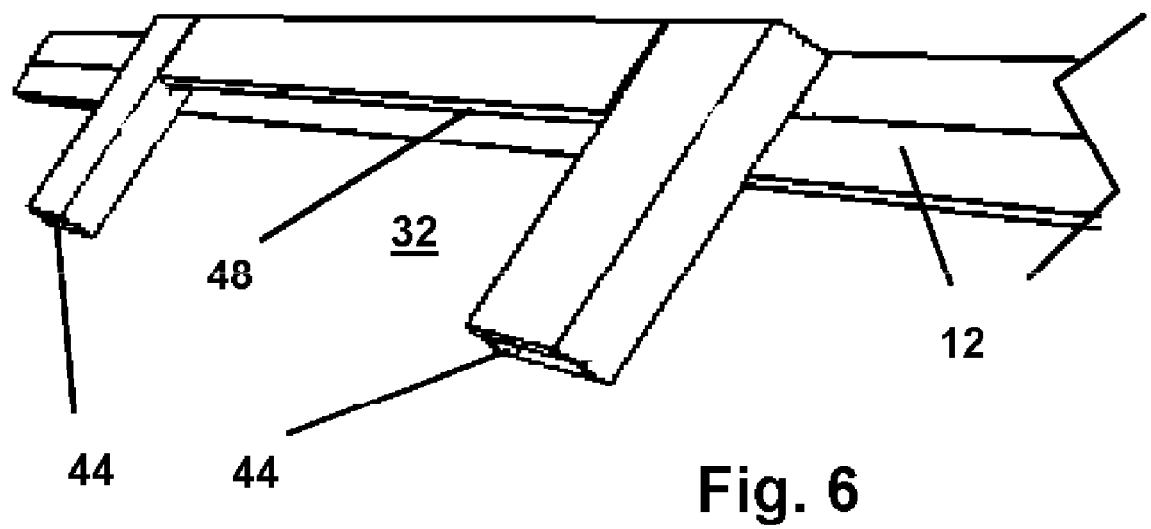
FIG. 6 depicts the rear side edge of the overhead planters which are adapted for a triangular engagement with the mount of FIG. 7.

A unique three point mount is provided for each overhead planter housing 18 to maintain it in place and resist tipping from wind and bumps. As can be seen in FIG. 7, a pair of "U" shaped flanges 40 are engaged to the cross member 20 and a "U" shaped elongated flange 42 extends between them. The U shaped pair of flanges 40 are sized to slide upward into slots 44 in a sidewall of each overhead planter 18. The slots project away from the outside surface of the rear wall 46 and allow the overhead planter to be slid downward on the two U-shaped flanges 40. As the slots 44 of the overhead planter 18 reach the bottom of the flanges 40, the elongated flange 42 engages a lip 48 extending from the backwall 46 of the overhead planters 18. This elongated lip 48 and flange 42 engagement provides a very stable mount against tipping longitudinally, and the combination of the higher elongated flange 42 engagement and the lower u-shaped flange 40 and slot 44 engagement forms a three point mount which helps prevent rotation or lifting of the overhead planers 18 in the wind or when bumped.

While all of the fundamental characteristics and features of the elevated support structure for planters have been disclosed and described, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

What is claimed is:

1. A modular planter apparatus comprising:
    a base planter housing having a cavity, said cavity having a cavity volume defined by a surrounding vertically disposed sidewall extending generally vertically from a bottom;
    a pair of elongated passages engaged with said sidewall and extending substantially vertically from a horizontal support surface for said base planter;
    a pair of elongated members, said elongated members adapted at respective first ends, for a frictional engagement within said elongated passages, said frictional engagement providing a means to support said elongated members in a substantially vertical position while concurrently engaged to said base planter;
    at least one support member engaged between said pair of elongated members;
    a pair of U-shaped flanges engaged upon each said support member, said flanges spaced a distance from each other;
    an elevated planter housing having a bottom wall and a sidewall extending therefor to define an interior cavity;
    said elevated planter having a pair of slots formed in said sidewall, said slots positioned said distance from each other whereby said U-shaped flanges are engageable with said sidewall of said elevated planter within said slots;
    said sidewall of said elevated planter having a edge surrounding an opening for said interior cavity; and
    a portion of said sidewall between said slots having a contact with said support member when said flanges are in an engagement with said slots; and
    said engagement of said flanges with said slots positioning said elevated planter in a mounted position, a distance above said base planter.

2. The modular planter apparatus of claim 1 additionally comprising:
    a U-shaped elongated connector engaged to said support member in between said U-shaped flanges;
    a lip formed adjacent to said edge of said sidewall of said elevated planter;
    said lip being engaged with said elongated connecter when said elevated planter is in said mounted position, thereby forming a three point mount of said elevated planter to said support member with said lip engaged with said connector a distance above said flange engagement with said slots; and
    said three point engagement providing a means to prevent rotation of said elevated planter from wind or bumping when said elevated planter is engaged to said support member.

3. The modular planter apparatus of claim 1 additionally comprising:
    said elongated members formed of a pair of component members;
    each said component member having one end with an interior recess formed therein; and
    a fitting, said fitting frictionally engageable with a said interior recess of each said component members, whereby an elongated member may be formed of two or more component members engaged with a fitting.

4. The modular planter apparatus of claim 2 additionally comprising:
    said elongated members formed of a pair of component members;
    each said component member having one end with an interior recess formed therein; and
    a fitting, said fitting frictionally engageable with a said interior recess of each said component members, whereby a said elongated member may be formed of two or more component members engaged with a fitting.

5. The modular planter apparatus of claim 1 additionally comprising:
    a length of each of said elongated members is determinable by a user employing two or more component members to form said elongated members;
    each said component member having one end with an interior recess formed therein; and
    a fitting, said fitting frictionally engageable with a said interior recess of each said component members, whereby a said elongated member may be formed in any said length by the cooperative engagement of two or more said component members to form said elongated members.

6. The modular planter apparatus of claim 3 additionally comprising:
    a length of each of said elongated members is determinable by a user employing two or more component members to form said elongated members;
    each said component member having one end with an interior recess formed therein; and
    a fitting, said fitting frictionally engageable with a said interior recess of each said component members, whereby a said elongated member may be formed in any said length by the cooperative engagement of two or more said component members to form said elongated members.

7. The modular planter apparatus of claim 1 additionally comprising:
    at plurality of support member engaged between said pair of elongated members;
    each of said plurality having a pair of said U-shaped flanges engaged upon each respective said support member, said flanges spaced a distance from each other;
    each said respective pair of U-shaped flanges being cooperatively engageable with any of a plurality of said elevated planters having said slots formed in a respective sidewall; and
    whereby a plurality of said elevated planters equal said plurality of support members are engageable to said support members in elevated positions above said base planter, said elevated positions being consecutively further from said support surface.

8. The modular planter apparatus of claim 2 additionally comprising:
    at plurality of support member engaged between said pair of elongated members;
    each of said plurality of support members having a pair of said U-shaped flanges engaged upon each respective said support member, said flanges spaced a distance from each other;
    each of said plurality of support members having a U-shaped elongated connector engaged to said respective support member in between said U-shaped flanges each said respective pair of U-shaped flanges being cooperatively engageable with any of a plurality of said elevated planters having said slots formed in a respective sidewall;

each respective U-shaped elongated connector being engageable with a lip formed upon each of said plurality of elevated planters;

whereby a plurality of said elevated planters equal to said plurality of support members are engageable to said support members in elevated positions above said base planter, said elevated positions being consecutively further from said support surface; and each of said plurality of elevated planters being engaged to a respective said support member in a three point engagement formed by said two flanges and said elongated connector.

9. The modular planter apparatus of claim 1 additionally comprising:

said cavity volume being equal to or greater than a sum of all respective said interior cavities of said elevated planters which are engaged to support members communicating between said elongated members, said cavity volume thereby providing a means to prevent tipping of said support members and said engaged elevated planters.

10. The modular planter apparatus of claim 7 additionally comprising:

said cavity volume being equal to or greater than a sum of all respective said interior cavities of said elevated planters which are engaged to support members communicating between said elongated members, said cavity volume thereby providing a means to prevent tipping of said support members and said engaged elevated planters.

11. The modular planter apparatus of claim 8 additionally comprising:

said cavity volume being equal to or greater than a sum of all respective said interior cavities of said elevated planters which are engaged to support members communicating between said elongated members, said cavity volume thereby providing a means to prevent tipping of said support members and said engaged elevated planters.

* * * * *